A. B. L. LINBERG, J. E. ANDREW & H. C. WRIGHT.
AUTOMATIC SPRING MAKING MACHINE.
APPLICATION FILED MAR. 12, 1915.
1,166,917.
Patented Jan. 4, 1916.
5 SHEETS—SHEET 5.
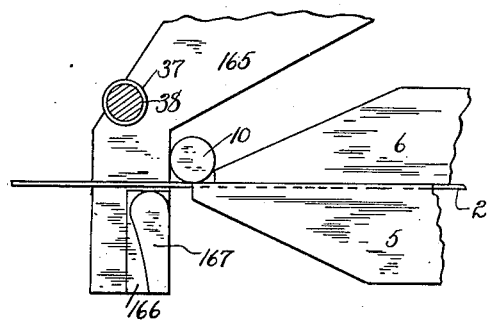
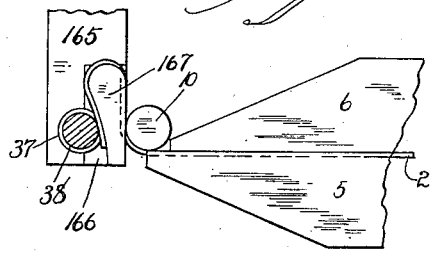
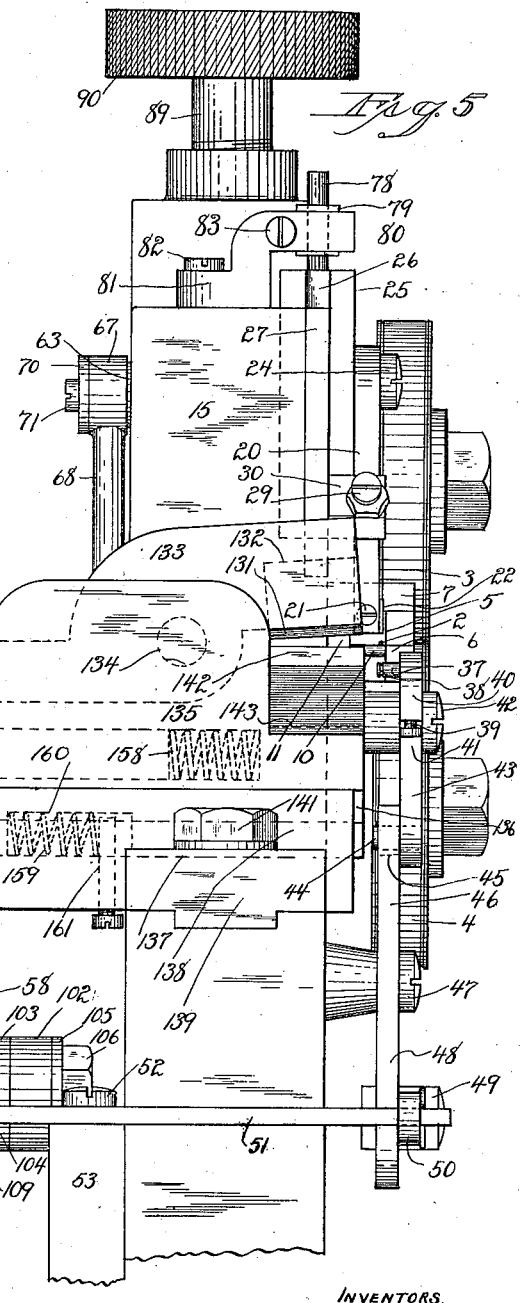
INVENTORS,
ADOLPH B. L. LINBERG
JOHN ERNEST ANDREW
HENRY C. WRIGHT

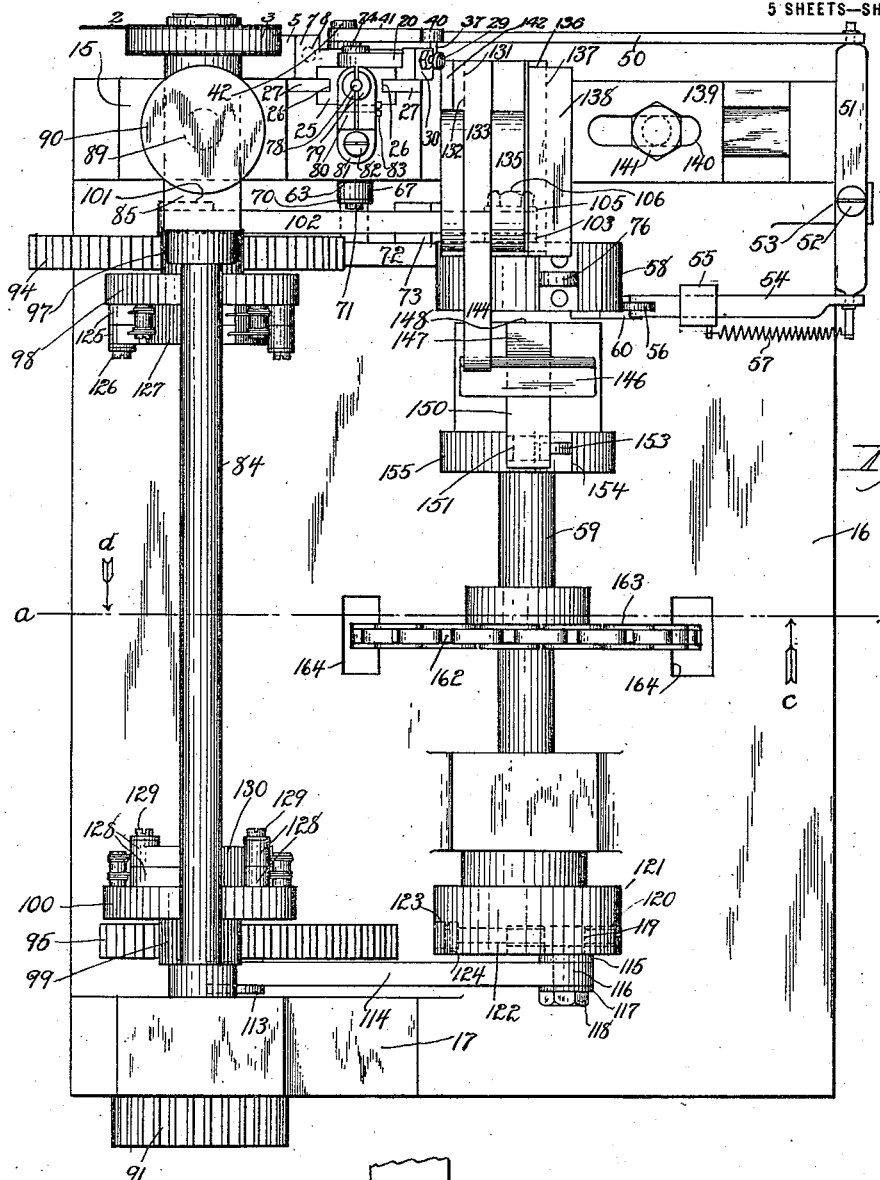

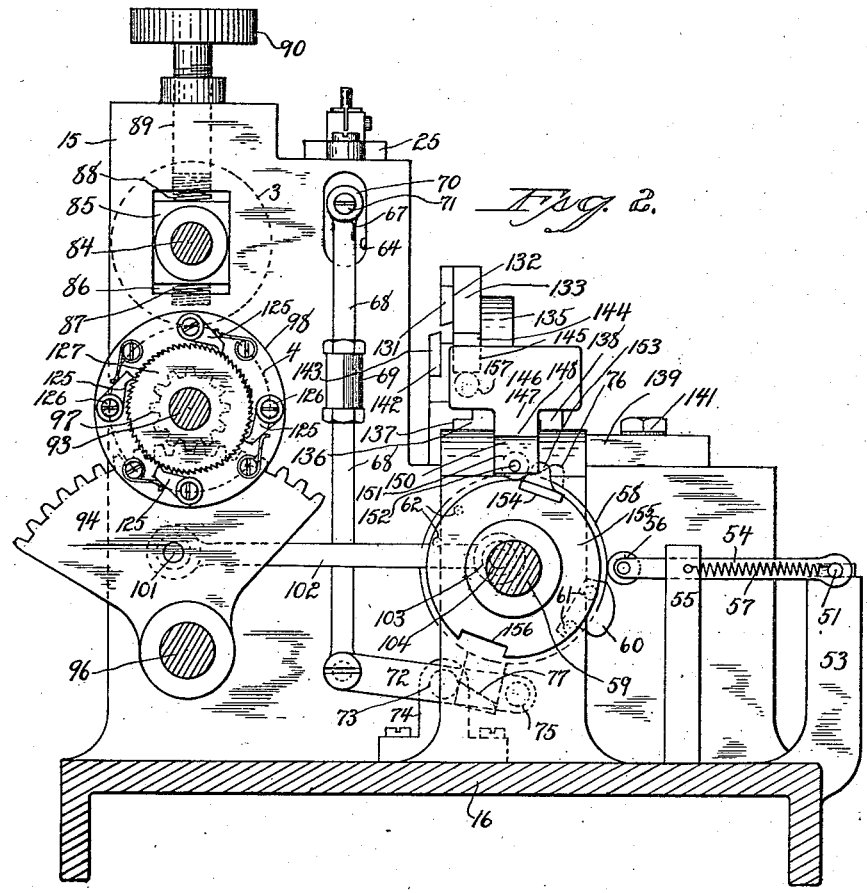
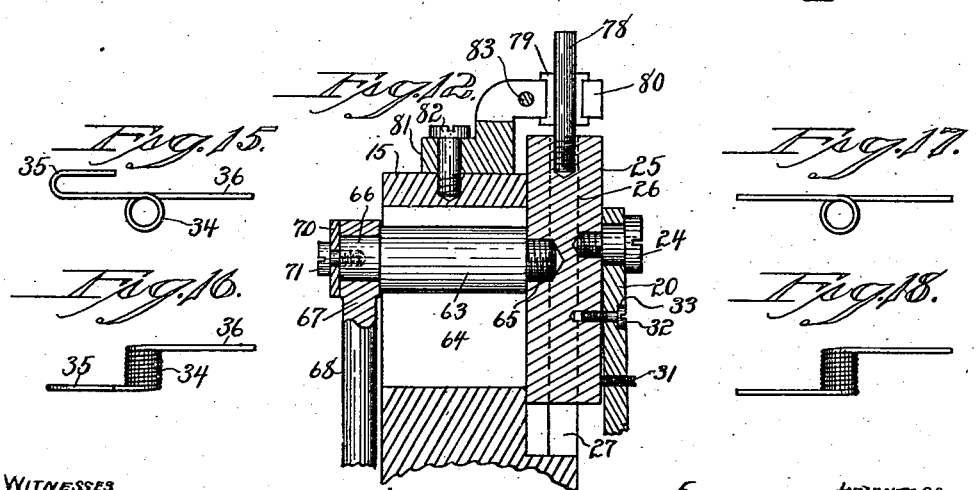

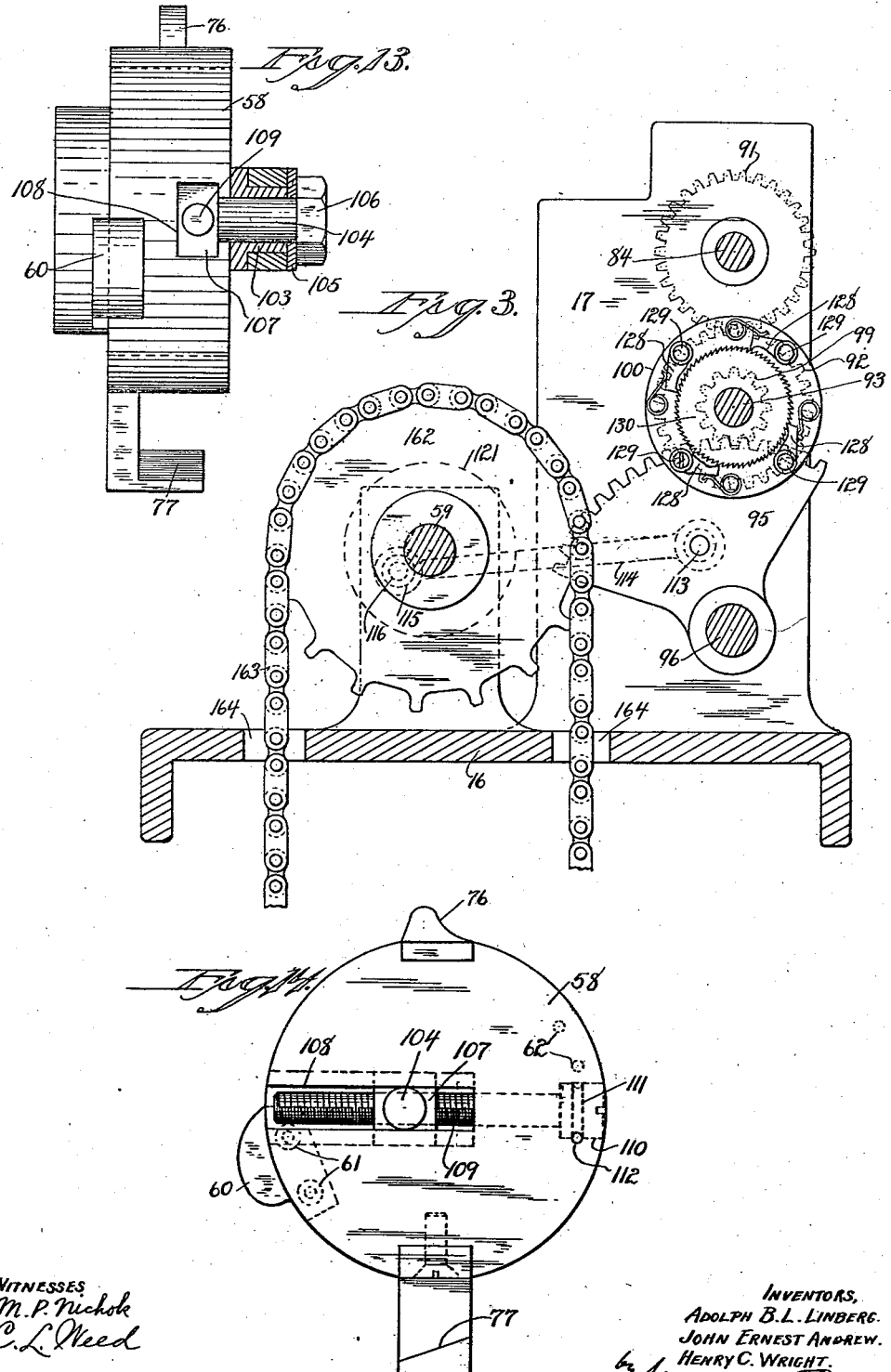

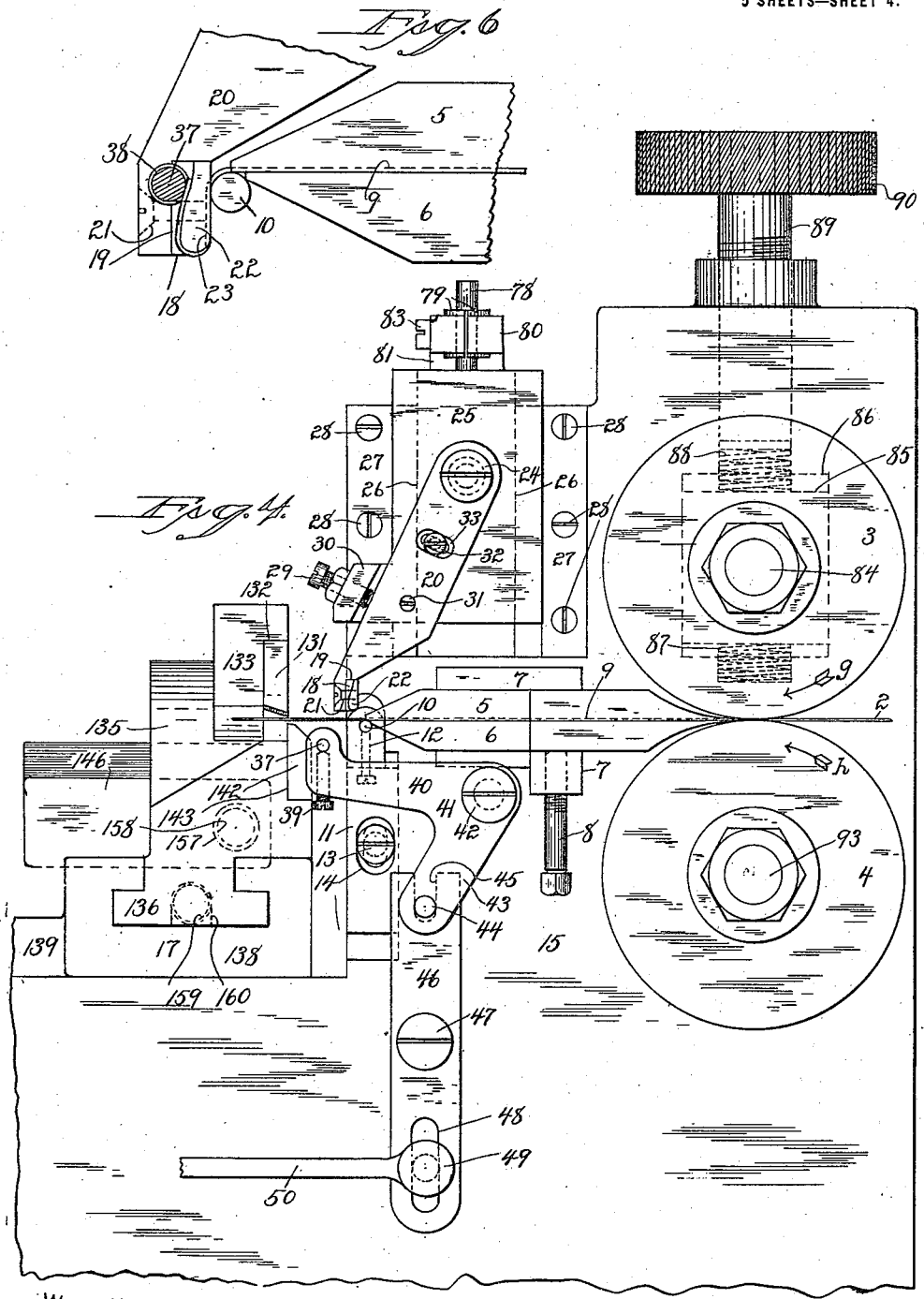

UNITED STATES PATENT OFFICE.

ADOLPH B. L. LINBERG, JOHN ERNEST ANDREW, AND HENRY C. WRIGHT, OF BRISTOL, CONNECTICUT, ASSIGNORS TO THE WALLACE BARNES CO., OF BRISTOL, CONNECTICUT, A CORPORATION.

AUTOMATIC SPRING-MAKING MACHINE.

1,166,917. Specification of Letters Patent. Patented Jan. 4, 1916.

Application filed March 12, 1915. Serial No. 13,844.

*To all whom it may concern:*

Be it known that we, ADOLPH B. L. LINBERG, JOHN ERNEST ANDREW, and HENRY C. WRIGHT, citizens of the United States, residing at Bristol, in the county of Hartford and State of Connecticut, have invented a new and useful Improvement in Automatic Spring-Making Machines; and we do hereby declare the following, when taken in connection with the accompanying drawings and the characters of reference marked thereon, to be a full, clear, and exact description of the same, and which said drawings constitute part of this application and represent in—

Figure 1 a plan view of one form which an automatic spring-making machine constructed in accordance with our invention may assume. Fig. 2 a view thereof in transverse vertical section on the line *a—b* of Fig. 1 looking forward or in the direction of the arrow *c*. Fig. 3 a corresponding view on the same line, looking rearward or in the direction of the arrow *d*. Fig. 4 a broken view of the machine in front elevation, on an enlarged scale. Fig. 5 a broken view in left-hand side elevation of the parts shown in Fig. 4, drawn to the same enlarged scale. Fig. 6 a detail broken view on a still larger scale showing the interrelation of the forming tools and the formation of a loop in the end of the wire. Fig. 7 a corresponding view showing the same parts as set for making left-hand springs, the parts being shown in the positions due to them just before the looping operation, and the die-carrier being slightly elongated. Fig. 8 a corresponding view of the same parts at the completion of the looping operation. Fig. 9 a detached broken view in inside elevation of the die and die-carrier. Fig. 10 a view thereof in horizontal section on the line *e—f* of Fig. 9. Fig. 11 a broken plan view of the looper-pin. Fig. 12 a broken view in vertical section of the die-carrier, the vertically movable slide therefor, and the parts immediately connected with the slide. Fig. 13 a detail view partly in side elevation and partly in section, of the forward feeder-head. Fig. 14 a view thereof in front elevation showing the adjustable crank-pin. Fig. 15 a face view of a spring formed in the machine and having one of its ends looped. Fig. 16 a plan view of the same spring. Fig. 17 a face view of such a spring as may be used in the improved machine with straight offsetting ends. Fig. 18 a plan view thereof. Fig. 19 a broken detail view showing the fed-end of the wire with a spring formed upon it ready to be cut off.

Our invention relates to an improved automatic machine for making right or left hand springs of the class commonly known to the trade as torsion springs, though also adapted to be used as compression or extension springs. These springs, however used, are characterized by a helical coil and offsetting ends one of which may or may not be looped, the object being to produce a machine having a large capacity for work and adapted to be adjusted for the production of a wide range of springs of this character at a low cost for manufacture.

With these ends in view, our invention consists in a machine of the character described, having certain details of construction and combinations of parts as will be hereinafter described and pointed out in the claims.

For the purpose of illustrating our invention, we have shown it herein as embodied in a machine adjusted for the production of right-hand springs having one end looped and the other straight.

In the machine illustrated, the stock wire 2 is fed by upper and lower feed-rolls 3 and 4, into a two-part wire-guide or quill the upper and lower parts 5 and 6 whereof are mounted in a quill-holder 7 in which they are rigidly secured by a binding-screw 8, the upper part 5 of the quill being formed with a longitudinal groove 9 just large enough to permit the passage through it of the wire 2 which rides over the flat upper face of the part 6 of the quill. When the machine is adjusted, as shown, for the production of right-hand springs, the tapered delivery-end of the upper part 5 of the quill is positioned so as to overhang the tapered delivery-end of the lower part 6 of the quill as shown in Fig. 6, and to extend part way over the former-pin 10 which is mounted at a right angle to the path of the wire 2 in the upper end of a vertically adjustable slide 11 in which it is secured by means of a set-screw 12, the slide being adjustably secured in place by means of a binding-screw 13 passing through an elongated slot 14 in the slide and itself entering the front face of the forward upright 15 of the machine-frame or bed 16 which is furnished at its rear end with a similar upright 17. The said former-pin 10 co-acts with an interchangeable die or anvil 18 set into a recess 19 in the lower end of a die or anvil-carrier 20 and secured in place by a screw 21. The said die is formed upon its outer edge with a looping-shoulder 22 rounded at its lower end and contracted at its upper end (Fig. 6) the inner face of this shoulder having a shallow vertical groove 23 which receives the fed end of the wire 2 which is deflected by the die 18 around the former-pin 10 under the endwise thrust imparted to the wire by the feed-rolls 3 and 4. The wire is thus coiled around rather than upon the former-pin which need not be cylindrical in form, though such form is preferred. The said die-carrier 20 is suspended by its upper end from a shouldered screw-stud 24 in a vertically movable slide 25 formed in its respective edges with vertical grooves 26 receiving guide-plates 27 secured to the forward upright 15 by screws 28. An adjusting-screw 29 mounted in a lug 30 engages with the outer edge of the carrier 20 and provides for positioning the die 18 accurately with respect to the former-pin 10, whereby the diameter of the springs produced is determined within the limits of the size of the particular former-pin 10 in use at any one time. A pitch-controlling screw 31 (Figs. 4 and 12) is mounted in the die-carrier 20 in position to engage with the front face of the slide 25, whereby the die 18 is laterally adjusted with respect to the line or path in which the wire 2 is fed so as to vary, as may be required, the angle or pitch of the coils of the springs to be produced, some springs being tight-wound with their coils in engagement and some being open-wound with spaces between the adjacent coils. A binding-screw 32 passing through a transverse slot 33 in the carrier 20 and threaded into the slide 25, provides for fixing the carrier in any of its adjusted positions.

As already stated, our machine, as shown, is designed to form one of the two offsetting ends of the springs, into a loop or hook as shown in Figs. 15 and 16, in which the spring consists of a helical coil 34 having a loop 35 at one end and a straight projection 36 at the other end. To produce such a spring, our machine is furnished with a horizontal looper-pin 37, (Fig. 11) formed close to its outer end with an annular wire-receiving groove 38 and secured by a set-screw 39 in the upper end of the upper arm 40 of a bell-crank looper-lever 41 hung upon a screw-stud 42 in the upright 15, the lower arm 43 of the said lever carrying a pin 44 entering a slot 45 in the upper end of a rocker lever 46 hung upon a screw-stud 47 in the upright 15 and having its lower end furnished with a slot 48 receiving a swivel bolt 49 in the adjacent end of a connecting-rod 50 the opposite end of which is connected with the forward end of a horizontal rocker-lever 51 hung on a stud 52 in a bracket 53 rising from the bed 16. The rear end of the lever 51 is connected with the outer end of a horizontal slide 54 mounted in a bearing 55 and having its inner end furnished with a roller 56 constantly maintained by a spring 57 in engagement with the periphery of the forward feeder-head 58 upon the main driving-shaft 59. For co-action with the roller 56, the head 58 is furnished with a removable looper-cam 60 secured in place by screws 61. As shown in Fig. 2, the feeder-head is furnished at a point diametrically opposite the cam 60, with screw-holes 62 which provide for shifting the cam 60 to the opposite side of the said head when it is desired to convert the machine for the production of left-hand springs. To produce springs without looping one of their offsetting ends, the looper-lever 41 may be removed or prevented from functioning by breaking its connection with the feeder-head 58.

For the actuation of the slide 25 upon which the die-carrier 20 is mounted, we employ a heavy shouldered stud 63 passing from rear to front through a slot 64 in the upper portion of the forward upright 15. The said stud is formed at its forward end with a threaded stem 65 entering the rear face of the slide 25. At its rear end, the stud is reduced to form a bearing 66 entering the eye 67 of the upper member of a two-part connecting-rod 68 the parts of which are connected by a take-up sleeve 69, the eye 67 being held in place upon the bearing 66 by means of a washer 70 and screw 71. The lower member of the rod 68 is connected with the adjacent end of a horizontal rocker lever 72 hung on a stud 73 in a bracket 74 bolted to the bed 16. At its opposite end, the lever 72 carries a roller 75 alternately co-acting with cams 76, 77, located at opposite points upon the forward feeder-head 58, the cam 76 operating to lift the slide 25 and the cam 77 operating to positively depress it.

For the better control of the slide 25 and hence of the die or anvil 18, I employ a friction-holder comprising a rod 78 threaded at its lower end into the upper end of the slide and passing upward through a two-part fiber bushing 79 mounted in a clamp 80 formed by slotting the upper end of a bracket 81 attached by a screw 82 to the upper edge of the upright 15, the clamp 80 being furnished with a clamping screw 83. Sufficient friction is produced in this way, to hold the slide 25 in any position in which it is moved by the action of either of the cams 76 and 77 and to counteract the tendency of the vibration of the machine to jar the slide 25 out of place.

The upper feed-roll 3 is mounted on the projecting forward end of an upper feed-roll shaft 84 having bearing at its forward end in a vertically movable block 85 located in an opening 86 in the forward upright 15, the said block resting at its lower end upon a spring 87 acting in opposition to a spring 88 resting upon its upper end and adjusted in tension by means of the stem 89 of a hand-wheel 90. At its rear end the shaft 84 bears in the rear upright 17. By turning the hand-wheel 90 for the compression of the spring 88, the spring 87 yields and permits the feed-roll 3 to grip the wire 2. On the other hand, when the hand-wheel 90 is reversed for the purpose of inserting the wire, the spring 87 asserts itself to lift the block 85 and hence the roll 3.

At its projecting rear end, the shaft 84 is provided with a pinion 91 meshing into a corresponding pinion 92 upon the projecting rear end of a lower feed-roll shaft 93, having bearing in the forward and rear uprights 15 and 17 and carrying at its projecting forward end, the lower feed-roll 4. Inasmuch as the total length of wire entering into the coil proper will ordinarily vary in different springs according to their diameter and length, from the total length of the wire forming the offsetting ends of the springs, it is desirable to have the coil-feed and ends-feed separate so that one may be regulated without disturbing the other. We do not limit ourselves to a feed of such a character, but we have shown such a feed and prefer to employ it.

The feed-rolls 3 and 4 mounted, upon the projecting forward ends of the shafts 84 and 93 have, as shown, step-by-step rotation imparted to them in the forward direction as indicated by arrows *g* and *h* (Fig. 4) by the alternate action of forward and rear segments 94 and 95 loosely rocking upon the opposite ends of a fixed shaft 96 located directly below the feed-roll shafts 84 and 93. The said segment 94 meshes into a pinion 97 fixed upon a pawl-carrying disk 98 loosely mounted upon the lower feed-roll shaft 93, while the said segment 95 meshes into a pinion 99 fixed to a pawl-carrying disk 100 also loosely mounted upon the rear end of the shaft 93. The segment 94 is provided with a stud 101 for the connection with it of a crank 102 the opposite end of which is sleeved over a flanged bushing 103 mounted upon an adjustable crank-pin 104 as shown in Fig. 13, the said crank being secured in place by means of a washer 105 and nut 106. The pin 104 forms a part of a sliding block 107 mounted in a radial-slot 108 in the forward face of the forward feeder-head 58 as shown in Fig. 14. The block 107 is tapped to receive an adjusting-screw 109 having a slotted head 110 set flush into the periphery of the head 58 and having a circumferential groove 111 receiving a pin 112 which holds the screw in place against endwise movement.

The rear segment 95 is provided with a stud 113 for the attachment of one end of a crank 114 the other end of which is sleeved over a flanged bushing 115 on a crank-pin 116 to which the crank 114 is secured by means of a washer 117 and a nut 118. The stud 116 forms a part of a sliding block 119 located in a radial T-slot 120 in the rear face of a feeder-head 121 corresponding to the feeder-head 58 but mounted upon the rear end of the main driving-shaft 59. The block 119 is adjusted in the slot 120 by means of an adjusting-screw 122 having a slotted head 123 set flush into the periphery of the feeder-head 121, the screw being held in place by means of a pin 124. Though shown with less detail, it will be understood that the adjustable connection between the segment 95 and the rear feeder-head 121 in every respect duplicates the connection of the segment 94 with the forward feeder-head 58, the latter being shown in detail in Figs. 13 and 14.

Returning now to the forward pawl-carrying disk 98 (Fig. 2), it carries, as shown, four corresponding pairs of spring-actuated pawls 125 hung upon screw studs 126 and all co-acting with a fine-toothed ratchet-wheel 127 rigidly secured to the lower feed-roll shaft 93 at the forward end thereof. These eight pawls are slightly differentiated in length so as to engage at different points throughout the length of the respective teeth of the ratchet-wheel 127, this being the common expedient for the reduction of slippage, thus made negligible. Correspondingly, the rear pawl-carrying disk 100 is provided with four pairs of spring-actuated pawls 128 hung upon screw studs 129 and co-acting with a fine-toothed ratchet-wheel 130 fixed upon the rear end of the lower feed-roll shaft 93. These pawls are also differentiated in length like the pawls 125, so as to reduce the slippage to a negligible amount.

It will be understood from the foregoing that the throw of the rocking segments 94 and 95 is determined by the position of the respective crank-pins 104 and 116, with regard to the centers of the forward and rear feeder-heads 58 and 121, whereby the step-by-step rotation of the feed rolls 2 and 3 and hence the coil-feed and ends-feed of the wire 2 is predetermined. It will also be noted that the pins 104 and 116 are located directly opposite each other on the opposite sides of the centers of the respective feeder-heads 58 and 121 so that the segments 94 and 95 are alternately operated in the sense that the driving throw of one segment is concurrent with the idle or return movement of the other segment, and vice versa. That is to say, when one segment is driving, the other segment is ratcheting-back into position for driving, and vice versa.

In practice there will be a momentary pause of extremely brief duration in the operation of the feed-rolls due to the dead-centering of the cranks 102 and 114 at the extreme limit of their throw in either direction when they are brought into parallelism with each other. This momentary pause in the feeding of the wire 2 is taken advantage of for cutting the wire and for looping and cutting the wire when a looper-tool is employed.

As herein shown, the cutting mechanism comprises a cutter 131 set into a recess 132 in the forward end of a rocker-arm 133 mounted on a stud 134 in a carriage 135 provided at its base with a T-head 136 reciprocating in a T-slot 137 formed in an adjustable guide 138 having an arm 139 containing a slot 140 receiving a binding-screw 141 in the forward upright 15 of the machine frame. The said cutter 131 co-acts with a corresponding, but stationary cutter 142 set into a recess 143 in the carriage 135. At its rear end the rocker-arm 133 is formed with an extension 144 having a cam-face 145 co-acting with a horizontally arranged beveled T-head 146 located at the upper end of the upper arm 147 of a bell-crank lever 148 hung upon a stud 149, and having its lower arm 150 furnished with an anti-friction roller 151 turning on a pin 152 and co-acting with a cut-off cam 153 set into a recess 154 in the periphery of a disk 155 on the main driving-shaft 59, the said disk 155 being formed with a recess 156 located directly opposite the recess 154 so that the cut-off cam 153 may be shifted in position in case it is desired to convert the machine for producing left hand springs.

Normally the cutters 131 and 142 stand sufficiently back of the path in which the wire 2 travels to permit the wire and the successive springs formed upon its fed end to be moved in front of the cutters from one side thereof to the other. Just before the cranks 102 and 114 reach their dead-centers, the bell-crank lever 148 is actuated by the cam 153, whereby the T-head 146 acts against a plunger 157 mounted in the carriage 135, the forward end of this plunger abutting against a spring 158 located within the carriage. The said carriage is now moved forward and with it the cutters 131 and 142, against the tension of a retracting spring 159, weaker than the spring 158, located in a recess 160 in the lower face of the carriage and impinging at its forward end against a stop-screw 161 extending upward through the guide 138. When the spring 159 has been fully compressed coil upon coil, it arrests the forward movement of the carriage 135 by which time the cutters 131 and 142 will, as it were, have straddled the wire at a point on the inside of the newly formed coil therein. The continued movement of the bell-crank lever 148 affects the compression of the spring 158 which permits the beveled T-head 146 to move forward with respect to the bevel 145 of the extension 144 of the rocker-arm 133 carrying the cutter 131, whereby the arm 133 is operated to depress the said cutter and cut off the newly formed spring which drops into any convenient receptacle. The cut-off cam 153 now releases the bell-crank lever 148, which rocks back into its retired position, whereupon the cutter 131 is lifted into its open position by the gravity of the extension 144. At the same time, the spring 158 asserts itself to push back the plunger 157 after which the retracting-spring 159 asserts itself to retract the carriage into its retired position in which the cutters 131 and 142 are returned into their clearance positions to the rear of the path of the wire 2 so that the same may be fed straightway in front of them.

As shown, the main driving-shaft 59 is operated by a sprocket-wheel 162 driven by a sprocket-chain 163 passing through openings 164 in the machine-bed 16 to any convenient source of power.

Before taking up the conversion of the machine illustrated for the production of left-hand springs, we will first describe its operation in the production of right-hand springs for which it is set as shown in all of the figures of the drawings with the exception of Figs. 7 and 8. In the first place, the crank-pin 104 is positioned by the adjusting-screw 109 (Fig. 14) as required to cause the feed-rolls 3 and 4 to feed the exact predetermined amount of wire in the combined ends of each spring, although as a matter of fact, in the operation of the machine, the total amount of wire fed as the result of this adjustment, goes into one end of one spring and the opposite end of the next succeeding spring to be produced. The crank-pin 116 is also adjusted by its screw 122 as required to cause the feed-rolls 3 and 4 to feed the exact predetermined length of wire which is to enter into the combined coils of the individual springs to be produced. In this connection it may be observed that the diameters of the springs is regulated by the relative adjustment or spacing of the several forming-tools with respect to each other, rather than by the diameter of the former-pin 10, since the wire is coiled by deflection around rather than by winding upon an arbor. Here we may say that in a broad view the quill, the former-pin 10, the die or anvil 18 and the looper-pin 37 are all forming tools since they all participate directly in forming the springs. The wire 2 having been introduced between the feed-rolls 3 and 4 and threaded through the two-part quill so as to project over the top of the former-pin 10, the machine is started, its parts being, as it may be assumed, in the positions in which they are shown in Fig. 4. The first action of the machine may be to cut off the end of the wire so that the remaining projecting end will be of the right length for the looped end 35 (Fig. 15) of the first spring produced. The feeding mechanisms of the machine will at this time be approaching and almost on their dead centers as shown in Figs. 2 and 3. The cam 77 on the feeder head 58 now operates to positively depress the die-carrier 20, while the looper-cam 60 acts to effect the lifting of the looper-pin 37. These two movements are substantially simultaneous, and result in wrapping the projecting end of the wire around the forming-shoulder 22 of the die or anvil 18. The looper-pin 37 now retires, leaving the die 18 close to, but not necessarily in contact with, the former-pin 10 and standing in the path in which the wire 2 travels, and at a right angle thereto. The rear feeder-head 121 now operates to actuate the feed-rolls 3 and 4 in their coil-feeding movement, whereby the wire is forced against the bottom of the groove 23 in the die 18 and coiled by deflection more or less loosely around the former-pin 10. The coil or spring proper 34 is thus produced, the pitch of its several coils being gaged by the screw 31 which predetermines the position of the groove 23 with respect to the line on which the wire is fed.

During the production of the coil 34, the loop 35 revolves in the air at the speed at which the coils are produced. The coiling of the wire continues until the coil-feed segment 95 has completed its feeding throw during which time the ends-feed segment 94 has been ratcheted back in the opposite direction into position to start its feeding throw, the two cranks 102 and 114 being now almost on their dead-centers in opposite positions from those in which they are shown in Figs. 2 and 3. The lifting-cam 76 on the feeder-head 58 now operates to raise the slide 25, whereby the anvil 18 is lifted into its retired or clearance position above the path of the wire 2. The ends-feed segment 94 now operates to drive the feed-rolls 3 and 4, whereby the wire is fed to the predetermined distance necessary to produce the straight inner end 36 of the spring first made and the straight end from which the looped end 35 of the next succeeding spring, is to be formed. At the conclusion of the feeding stroke of the segment 94, during which the segment 95 has been ratcheted back into its starting position, the cranks 102 and 114 of the respective segments are again approaching their dead-centers, and again in the positions in which they are shown in the drawings, barring Figs. 7 and 8. Just before the two cranks reach their dead-centers, the cutter-cam 153 begins to operate, whereby the carriage 135 is moved forward to cause the cutters 131 and 142 to straddle the wire at the point x in Fig. 19. When the cranks are actually on their dead-centers, the cutter-cam 153 completes its work by cutting the wire at the point x, whereby one complete spring is produced, leaving the exact length of wire required for producing the looped arm 35 of the next succeeding spring. The operations above recited are continuously repeated for the production of each spring.

If it is desired to produce left-hand springs, the die-carrier 20 is removed and replaced by a similar die-carrier 165 corresponding to the said die-carrier 20 except in so far that its lower end is made long enough to position the die 166 below rather than above the line of travel of the wire 2 when the slide 25 is at the limit of its downward movement. The die 166 is exactly like the die 18 except that its forming shoulder 167 is reversed in position end for end. The set-screw 8 is now loosened and the two-part quill 5 and 6 removed from the holder 7. The screw 13 is also loosened and the slide 11 lifted to position the former-pin 10 (Figs. 7 and 8) directly above, rather than below, the path of travel of the wire 2. The two-part quill is now restored to the quill-holder 7 but in reverse position as shown in Figs. 7 and 8, so that the tapered delivery-end of the member 5 of the quill will project beyond the corresponding end of the member 6 of the quill, instead of the reverse arrangement (Figs. 4 and 6) as required for winding right-hand springs. The bell-crank looper-lever 41 is replaced by a lever sufficiently changed in form as to normally hold the looper-pin 37 above the line of travel of the wire 2 as shown in Figs 7 and 8, instead of below the said line of travel as elsewhere shown. The crank-pin 104 of the feeder-head 58 is now readjusted as required to devolve upon the forward segment 94, the function of actuating the feed-rolls 3 and 4 for the coil-feed of the wire, while the crank-pin 116 of the feeder-head 121 is adjusted to devolve upon the segment 95, the ends-feed of the wire, one segment doing the work formerly done by the other in winding right-hand springs. The looper-cam 60 is now shifted to the opposite side of the feeder-head 58, so that its screws 61 will occupy the screw-holes 62, while the cutter-cam 153 is removed from the notch 154 in the cam disk 155 and inserted into the recess 156 therein. The machine has now been converted for the production of left-hand springs which may be described as corresponding in character to left-hand screws. When converted for producing left-hand springs, the cycle of operations is the same as that already given with the exception that the wire is deflected upward instead of downward by the forming tools by which we mean to include the quill, the former and looper-pins and the die or anvil, which might be replaced by a roller or other form of deflecting tool, the term anvil being used in the text and claims in the sense of a deflecting tool.

We claim:—

1. A machine of the character described, comprising means for feeding the wire, coil-forming tools, and means for automatically altering the co-acting relationship of the said tools to permit the straight travel of the wire in forming offsetting ends upon the ends of the spring coils.

2. A machine of the character described, comprising means for feeding the wire, coil-forming tools including a deflecting tool, and means for moving the said tool to alter the co-acting relationship of the tools to permit the straight travel of the wire for forming offsetting ends upon the ends of the spring coils.

3. A machine of the character described, comprising means for feeding the wire, coil-forming tools, means for altering the co-acting relationship of the said tools to permit the straight travel of the wire for forming offsetting ends upon the ends of the spring coils, and means for changing the pitch of the coils.

4. A machine of the character described comprising means for feeding the wire, coil-forming tools including an anvil, means for shifting the anvil with respect to the other tools to permit the straight travel of the wire for forming offsetting ends upon the ends of the spring coils, and means for adjusting the anvil to change the pitch of the coils.

5. A machine of the character described, comprising means for feeding the wire, and coil-forming tools including a wire-guide, a former and an anvil which latter effects the deflection of the wire around the former, and means for automatically altering the co-acting relationship of the said tools to permit the straight travel of the wire in forming offsetting ends upon the ends of the spring coils.

6. A machine of the character described comprising means for feeding the wire, a quill or wire guide, a former and a die or anvil, and means for automatically altering the co-acting relationship of the said tools to permit the straight travel of the wire in forming offsetting ends upon the ends of the spring coils.

7. A machine of the character described comprising means for feeding the wire, coil-forming tools, means for automatically altering the co-acting relationship of the said tools to permit the straight travel of the wire in forming offsetting ends upon the ends of the spring coils, the elements of the machine being constructed to be convertible for winding right or left hand springs.

8. A machine of the character described comprising means for feeding the wire, coil-forming tools, means for altering the co-acting relationship of the said tools to permit the straight travel of the wire in forming offsetting ends upon the ends of the spring coils, and means for looping one of the offsetting ends of each spring.

9. A machine of the character described, comprising means for feeding the wire, coil-forming tools, means for altering the co-acting relationship of the said tools to permit the straight travel of the former in forming offsetting ends upon the ends of the spring coils, a looper for looping one of the offsetting ends of each spring, and means for putting the said looper out of action.

10. A machine of the character described, comprising means for feeding the wire, a wire-guide, a former, a die or anvil furnished with a forming shoulder, a looper co-acting with the said shoulder, and means for altering the co-acting relationship of the said tools to permit the straight travel of the wire in forming offsetting ends upon the ends of the spring coils.

11. A machine of the character described, comprising means for feeding the wire, a wire-guide, a former, a die or anvil, a carrier therefor, and means for moving the carrier to shift the position of the die with reference to the line of travel of the wire through the guide to permit the straight travel of the wire in the intervals between the insertion of the die into the said path for the deflection of the wire around the former.

12. In a machine of the character described, comprising means for feeding the wire, coil-forming tools, means for altering the co-acting relationship of the said tools to permit the straight travel of the wire in forming offsetting ends upon the ends of the spring coils, and means for successively cutting off the springs after their formation upon the fed end of the wire.

13. A machine of the character described, comprising means for feeding the wire, coil-forming tools, means for altering the co-acting relationship of the said tools to permit the wire to be alternately coiled and fed straight, a cutter, a carrier for the said cutter, and means for moving the said carrier at a right angle to the path of the fed wire whereby the cutter may be retired to permit the coiled wire to be fed into the position to be cut.

14. A machine of the character described, comprising a wire-guide, means for feeding the wire through the said guide characterized by having a dead center, coil-forming tools, means for altering the co-acting relationship of the said tools to permit the wire to be alternately coiled and fed straight, cutting mechanism, and means for operating the said cutting mechanism when the feeding mechanism is in the dead center phase of its operation.

15. A machine of the character described, comprising a wire-guide, means for feeding the wire under endwise pressure through the said guide, the said means being characterized by two dead centers, coil-forming tools, means for altering the co-acting relationship of said tools to permit the wire to be alternately coiled and fed straight, a cutter, and means for operating the said cutter during one of the dead center phases of the operation of the mechanism for feeding the wire.

16. A machine of the character described, comprising a wire-guide, a wire-feeding mechanism having two dead centers, coil-forming tools, means for altering the co-acting relationship of the said tools during one of the dead-center phases of the operation of the wire-feeding mechanism, a cutter, and means for operating the said cutter during the other dead-center phase of the wire-feeding mechanism.

17. A machine of the character described, comprising a wire-guide, a wire-feeding device comprising an independently adjustable coil-feed mechanism and an independently adjustable ends-feed mechanism, coil-forming tools, means for altering the co-acting relationship of the said tools to permit the wire to be alternately coiled and fed straightaway, a cutter, and means for operating the same.

18. A machine of the character described, comprising a wire-guide, a wire-feeding device including an independently adjustable coil-feed mechanism and an independently adjustable ends-feed mechanism, each mechanism having a dead-center phase in its operation, coil-forming tools, means for altering the co-acting relationship of the said tools during the dead-center phase of the coil-feed mechanism, to permit the wire to be alternately coiled and fed straightaway, a cutter, and means for operating the said cutter during the dead-center phase of the ends-feed mechanism.

In testimony whereof we have signed this specification in the presence of two subscribing witnesses.

ADOLPH B. L. LINBERG.
JOHN ERNEST ANDREW.
HENRY C. WRIGHT.

Witnesses.
L. D. ADAMS,
T. W. COOK.